April 5, 1960

G. W. UNDERWOOD ET AL 2,931,885

HIGH FREQUENCY ELECTRIC WELDING WITHOUT
ROUGH AND EXCESSIVE INSIDE FLASH

Filed April 25, 1958

INVENTORS.
GEORGE W. UNDERWOOD
AND HARRY LA TOUR,
BY

Allen & Allen

ATTORNEYS.

United States Patent Office 2,931,885
Patented Apr. 5, 1960

2,931,885

HIGH FREQUENCY ELECTRIC WELDING WITHOUT ROUGH AND EXCESSIVE INSIDE FLASH

George W. Underwood and Harry La Tour, Middletown, Ohio, assignors to Armco Steel Corporation, Middletown, Ohio, a corporation of Ohio Application April 25, 1958, Serial No. 730,920

6 Claims. (Cl. 219—67)

This invention relates to high frequency electric welding of metallic sheets or strips whereby rough and excessive flash on one side of the weld is avoided. In speaking of high frequency electric welding, we have in mind either high frequency resistance welding or high frequency induction welding. The benefits of our invention are achieved with either of the two types of high frequency electrical welding.

While the invention is adaptable to the butt welding of flat sheets, it is particularly advantageous in the welding of tubing either with a longitudinal seam or with a spiral seam, where it is very desirable in many cases to provide a tubing which is perfectly smooth on the inside.

Generally speaking, when two edges are welded together there is produced a ridge on both sides of the joint. This ridge is generally called a flash. While in many cases the flash is unobjectionable, there are probably more situations where the flash is objectionable, particularly where the flash is rough and ragged, and not merely a slight, smooth ridge. Various means have been utilized for removing the flash. Sometimes a rolling mechanism is used to roll down the flash and flatten it and sometimes a scarfing device is used to scarf off the flash.

Thus, where the flash is in an accessible position, as for example on the outside of pipe or tubing, one of the well known flash removing means may be employed. Where, however, the flash is on the inside of pipe or tubing, it becomes very much more difficult to remove the flash and the difficulty increases as the diameter of tubing decreases.

One of the principal causes of the flash is the expulsion of molten particles of metal in both directions from the hot contiguous edges under the influence of the magnetic field of the welding current. It is this action which produces the ragged and rough seam which is particularly objectionable. Another cause of flash is the excessive upsetting and extrusion of the hot plastic metal as the two edges are forced together. When the edges of the pieces to be welded are parallel and forced together progressively in the conventional manner, it is only possible to avoid excessive ridging on both sides by very careful and continuous regulation of the welding current or the pressure. This has sometimes involved extremely complicated and expensive regulating mechanisms responsive even to minor variations in strip gauge.

It is therefore an object of our invention to provide a method of welding, using either high frequency resistance welding techniques or high frequency induction welding techniques whereby one side of the weld may be kept free of flash, or at least free from the ragged, rough and excessive flash referred to above. It is a more particular object of our invention to provide a method of welding a seam in pipe or tubing, whereby the inside of the seam inside the pipe or tubing is free from flash of this type. It is a further object of our invention to provide a method of electrical resistance welding less sensitive to minor variations in welding current and pressure.

These and other objects of the invention which we shall disclosed in more detail hereinafter or which will be apparent upon reading these specifications, we accomplish by that series of steps of which we shall now disclose exemplary embodiments.

Reference is made to the drawings forming a part hereof and in which.

Figure 1:
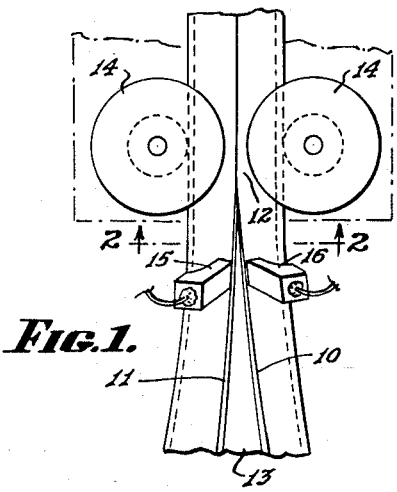
Figure 1 is a somewhat diagrammatic plan view of a pipe mill in the region where the weld is being performed, showing the use of high frequency resistance welding.

We have found that by utilizing the principles of our invention excellent resistance welds can be made continuously without the degree of careful regulation of current or pressure necessary with conventional parallel welding edges. It is only necessary to push the edges together far enough to close the open end of the V-notch without regard to the amount of pressure required.

Briefly, in the practice of our invention we bring the edges to be welded together progressively in such a manner that the edges are in contact first on that side of the seam on which flash is to be eliminated, leaving a V-shaped notch perpendicular to the sheet surfaces and facing in the other direction. When the edges so juxtaposed are subjected to either high frequency resistance heating or high frequency induction heating applied near the edges at a short distance ahead of the point at which welding pressure is applied and on the side opposite from the vertex of the V, there is manifested a motor effect or pinch effect on any molten metal which may form in the notch, tending to cause such molten metal to move out of the notch on the open side. As the edges being welded are progressively forced together the weld is completed largely by an upsetting action in the solid state and the flash is entirely on the side toward which the open notch originally faced. The finished weld will be free of rough and excessive inside flash, and will, at worst, exhibit only a slight smooth ridge. This is what is meant by the phrase "free from flash" as used in the claims.

While we do not wish to be bound by theory, we believe that this is due to a combination of effects resulting from the use of high frequency electric current in combination with the V-notch. The current follows the lowest impedance path from one contact electrode or from the first point of inductive coupling along one strip edge to its point of contact with the other edge, and back along the other edge to the other electrode or the last point of inductive coupling. While this arrangement has been utilized previously in resistance welding to concentrate the heating at the area to be welded, we find that with high frequency current applied near the edges of the open V-shaped notch the current instead of its usual path tends to concentrate itself along the open corners of the V-notch, heating them more rapidly than the opposite edges which contact to form the vertex of the V. This restriction of the current to the surface is because of the skin effect common in high frequency circuits. The vertex edges are believed to be heated largely by thermal conduction. This causes the V-notch to be welded progressively from the vertex to the open end of the notch principally by a progressive upsetting action caused by the applied pressure with a minimum of metal fusion. Early contact and perhaps welding of the vertex of the notch prevents the minor amount of fused metal produced from getting inside the tube, in the case of tube welding, and in fact, it will be blown out of the open side of the notch by the magnetic field present. This blowing of the flash to the outside or open side of the V-notch is not completely understood but is believed to result from the motor effect on the molten metal which always moves it in the direction of an applied high frequency field. This is probably aided by the sloping sides of the notch, which contribute an upward component of motion to any fused metal particle as it is propelled by the reaction between its induced current and the magnetic field.

Whatever the theory behind this action is, the result is that the molten metal which forms the weld tends to move upwardly or outwardly in the notch, so that practically all the flash is found on one side of the weld with the other side of the weld being substantially free from flash.

Since the principles of high frequency induction welding and high frequency resistance welding are known, we shall not go into these in the present specification, save to say that when we speak of high frequency welding we are speaking in terms of a frequency preferably of about 450 kilocycles, with a voltage across the brushes on the order of 50 volts. The frequency and voltage are not critical, and frequencies as low as 10 kilocycles have been used in induction welding. It should be pointed out, however, that the skin effect utilized in the preferred form of this invention is more pronounced the higher the frequency, thus causing our preference for the higher ranges.

As far as the metal being welded is concerned, we find that the method we describe hereinafter works with equal success on any metal, whether it be ferrous or non-ferrous or an alloy.

The V-shaped notch which has been mentioned above may be achieved in either one of two ways with equally good results. Either the edges to be welded may be scarfed or beveled over a major part at least of their surface so that when they are juxtaposed there will be formed the V-shaped notch which may have an included angle of from 5° to 45°. Alternatively, the edges to be welded may be perpendicular but may be brought into contact in non-parallel relation to provide between the perpendicular butt edges the V-shaped notch having an extent of from 5° to 45°. Under some conditions one of the alternative procedures may be preferable to the other.

Referring now in more detail to the drawings, we have shown in Figure 1 the high frequency high voltage resistance welding of a longitudinal seam in tubing formed from a flat long strip. By means of apparatus not shown, the flat strip is formed up into a tubular configuration so that the edges to be welded, and indicated at 10 and 11, approach each other in an elongated V as seen in Figure 1. In some tube forming machines this is brought about farther from the welding point than is here illustrated. The weld point is indicated at 12. The strip from which the tubing is formed is indicated at 13 and a pair of pinch rollers are shown at 14. 15 and 16 are a pair of sliding contact shoes or brushes through which the high frequency high voltage current is brought into the material to be welded. As is well known, the current will travel from the shoe 15 along the edge 11 to the weld point 12 and back along the edge 10 to the shoe 16. This high frequency high voltage current rapidly heats the edges to be welded to welding temperature, the depth of current penetration being very small and on the order of approximately .003 inch. The opposed pinch rolls 14 are of course configured as well known in the art to squeeze the tubing into circular form and to force the edges being welded together until the top of the V-notch is closed to insure a good weld.

It will of course be understood that the sliding contact shoes may be replaced by a contracting wheel or wheels (not shown). Such wheels are well known, and usually consist of two current carrying wheels insulated from each other, and usually water cooled.

Figure 2:
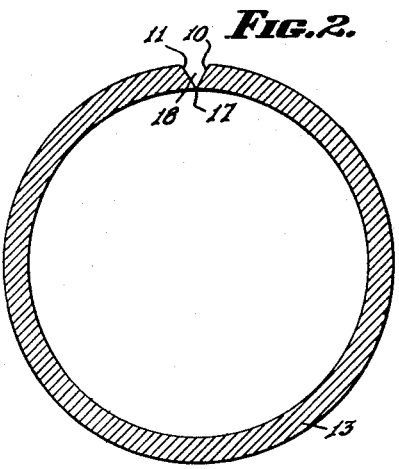
Figure 2 is a cross-sectional view through the tubing taken on the line 2—2 of Figure 1 on a greatly enlarged scale.

According to our invention, in one aspect we scarf the edges 11 and 10, as best seen in Figure 2, so that when they are brought into juxtaposition by the forming rolls (not shown) they will contact each other at the inside of the pipe at the point indicated at 17 but will leave the outwardly facing notch 18 having an included angle of from 5° to 45°.

Figure 3:
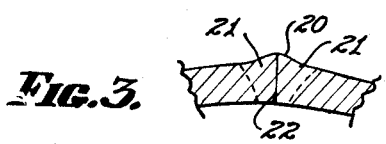
Figure 3 is a fragmentary view similar to Figure 2 showing the completed weld.

Whatever the true principle of operation may be, the actual result is that the metal tends to move upwardly and outwardly, as seen in Figure 3, to form a seam 22 having a shallow bead or flash 20 on the outside of the tube while the inside is smooth and substantially free from flash. Microscopic examination of the finished weld shows a grain structure indicating that only a small part of the metal if any has been molten during the welding. When this is observable at all, it is in the outside bead 20, the remainder of the metal which flowed to fill up the notch, as at 21, having a completely recrystallized structure approaching closely that of the unheated strip and nearly obliterating the junction line 22.

Figure 6:
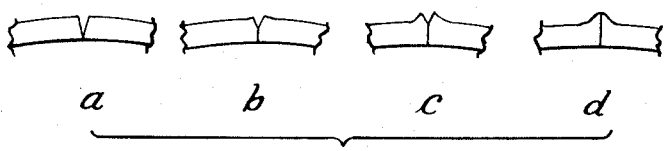
Figures 6a, 6b, 6c, 6d are illustrative of four stages of the weld formation in accordance with our invention.
Figure 5:
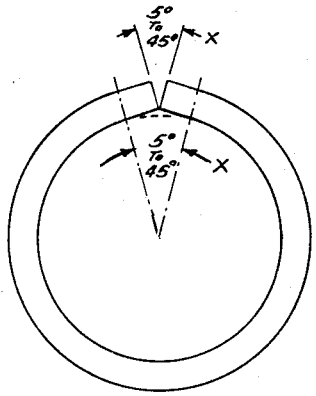
Figure 5 is a view similar to Figure 2 but showing a modification.

Instead of scarfing the edges to be welded, as described above, we can avoid the necessity of scarfing by having the edges perpendicular and forming the strip into a tube which is circular over a major portion, with the edges to be welded being tangent to the circle, or of a greater radius of curvature. In Figure 5, for example, the angle X of the notch having a definite value between 5° and 45°, the tube will be circular except for a portion adjacent the edges to be welded also included in an angle X. In this way, the same geometry of the butting edge is achieved and in the pinch rollers 14 the tubing will be pinched together far enough to close the open end of the V-notch during the formation of the weld, as illustrated progressively in Figure 6 by 6a, 6b, 6c and 6d. In this modification, the resulting tube may not have the desired exactly circular configuration, but this can easily be restored by passage through the sizing section of the tube mill which is a customary procedure in the manufacture of welded tubing.

Figure 4:
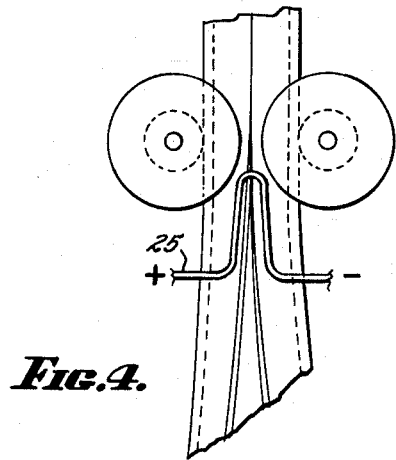
Figure 4 is a view similar to Figure 1 showing the use of high frequency induction welding.

In Figure 4, we have shown the use of high frequency induction welding wherein a conductor 25 is used to produce the localized welding heat by inductive coupling and without physical contact with the tube.

If the V-shaped notch is to be achieved by scarfing the edges to be welded, it will be understood that the strip may have its edges scarfed or beveled before the forming operation or incident to the forming operation, so that the particular point in the operation at which the scarfing or beveling takes place is not important so long as it is done before the welding zone is reached.

It will be noted that according to this invention the use of a backing shoe or plug is rendered unnecessary, although a plug of high magnetic permeability may be used to help localize the magnetic field if desired. It will be clear that the principles disclosed herein may be used with pipe formed from metallic strip and having helically welded seam. With helically seamed pipe, the scarfing principle of Figure 2 may be more desirable, whereas with longitudinal seamed tubing probably the distortion principle of Figure 5 is preferable.

It will be clear that numerous modifications may be made without departing from the spirit of the invention, and we therefore do not intend to limit ourselves except as set forth in the claims which follow.

Having now fully described our invention, what we claim as new and desire to secure by Letters Patent is:

1. In the production of a welded seam free from flash on one side, by high frequency electric welding, the steps of bringing the perpendicular edges to be welded into contact on that side which is to be free from flash, leaving a V-shaped notch on the other side, heating said edges to welding temperature by means of high frequency electric current and angularly displacing said edges to close said notch and force said edges together.

2. The method of claim 1, wherein said V-shaped notch has an included angle of from 5° to 45°.

3. The method of claim 1, wherein the high frequency welding current is applied primarily to said other side adjacent the edges to be welded and ahead of the point at which said edges are displaced to form the weld.

4. In the high frequency electric welding of a tubing seam, the steps of progressively forming a flat strip with perpendicular edges into the form of a circle with the edge portions to be welded being in contact with each other at the inside of the formed tubing and leaving an outwardly facing V-shaped notch, heating the edges to be welded to welding temperature by means of high frequency electrical current and progressively forcing said edge portions together until said V-shaped notch is closed, whereby a weld is formed free from inside flash.

5. The method of claim 4, wherein said V-shaped notch has an included angle of from 5° to 45°.

6. The method of claim 4, wherein the high frequency welding current is applied primarily to the outside of the formed tubing adjacent the edges to be welded and ahead of the point at which the edges are progressively forced together to form the weld.

References Cited in the file of this patent

UNITED STATES PATENTS

| 1,205,511 | Butcher | Nov. 21, 1916 |
| 2,222,579 | Walcott | Nov. 19, 1940 |

FOREIGN PATENTS

| 716,378 | Great Britain | Oct. 6, 1954 |
| 748,528 | Great Britain | May 2, 1956 |